United States Patent [19]
Bouchard et al.

[11] Patent Number: 5,630,590
[45] Date of Patent: May 20, 1997

[54] METHOD AND APPARATUS FOR IMPROVING THE AIRSEALING EFFECTIVENESS IN A TURBINE ENGINE

[75] Inventors: Joseph P. Bouchard, Arundel; Merrell W. Long, North Waterboro, both of Me.

[73] Assignee: United Technologies Corporation, Hartford, Conn.

[21] Appl. No.: 625,427

[22] Filed: Mar. 26, 1996

[51] Int. Cl.$^6$ ................................. F16J 15/447
[52] U.S. Cl. .................. 277/53; 415/170.1; 415/230
[58] Field of Search .................. 415/170.1, 174.2, 415/229, 230; 277/53

[56] References Cited

U.S. PATENT DOCUMENTS

| | | | |
|---|---|---|---|
| 4,209,268 | 6/1980 | Fujiwana et al. | 277/53 |
| 5,074,748 | 12/1991 | Hagle | 415/170.1 |
| 5,114,159 | 5/1992 | Baird et al. | 415/174.2 |
| 5,181,728 | 1/1993 | Stec | 277/53 |
| 5,201,530 | 4/1993 | Kelch et al. | 277/53 |
| 5,480,165 | 1/1996 | Flower | 277/53 |
| 5,501,573 | 3/1996 | Sanders | 277/53 |
| 5,522,698 | 6/1996 | Butler et al. | 415/170.1 |

*Primary Examiner*—John T. Kwon
*Attorney, Agent, or Firm*—Kenneth C. Baran

[57] ABSTRACT

A method for improving effectiveness of a labyrinth seal 40 between coannular components 22, 30 in a turbine 10 includes reconfiguring one of e components to provide means for receiving and retaining a replaceable brush seal 60 installing the brush seal so that the seal bristles impede the leakage of air through an intercomponent gap 41. In the preferred embodiment the reconfiguring step is applied to a hollow, cylindrical barrel 30 and includes machining the barrel to reduce its axial length and its wall thickness and also includes attaching a retainer 52. The retainer cooperates with the barrel to define a groove 56 within which the brush seal is trapped radially and axially. The brush seal slides circumferentially within the groove to facilitate seal installation and removal. The invention despenses with the need to carry out an expensive and time consuming replacement or renovation of the worn labyrinth seal.

9 Claims, 3 Drawing Sheets

METHOD AND APPARATUS FOR IMPROVING THE AIRSEALING EFFECTIVENESS IN A TURBINE ENGINE

TECHNICAL FIELD

This invention relates to the refurbishment of a gas turbine engine component to improve the effectiveness of an air seal between the component and a neighboring component.

BACKGROUND OF THE INVENTION

Gas turbine engines contain a variety of seals to prevent the leakage of working medium air out of the main flowpath of the engine. Minimization of leakage is important since leakage degrades the efficiency of the engine thereby increasing the engine's fuel consumption and cost of operation. Moreover, pressurized air which escapes from the flowpath has an elevated temperature and may come in contact with engine components whose tolerance for such temperatures is limited.

Knife edge seals are commonly used to seal the annular gap between rotating and nonrotating coannular components in turbine engines. A knife edge seal is a ring of material extending radially from a nonrotating component toward a seal land on a neighboring, coannular rotating component (or from the rotating component toward the nonrotating component). The knife edge ring terminates in close proximity to the seal land to inhibit the leakage of air through the annular gap. During engine operation the knife edge ring can contact the rotating seal land due to imbalance of the rotating component, differential thermal response of the components, or imperfections in the concentricity or dimensions of the components. Such contact erodes the knife edge ring and the seal land and diminishes the effectiveness of the seal. Moreover, operational experience suggests that most of the seal degradation occurs quite early in the life of an engine. Accordingly, the engine operates with a deteriorated seal throughout much of its life.

The seal effectiveness can be restored by removing the engine from service, replacing or renovating the knife edge ring and renovating the seal land. Unfortunately this is time consuming and expensive and results in the loss of revenue while the engine is out of service. Furthermore, the renovated seal is no more durable than the original seal, therefore the need to replace or renovate the seal recurs periodically throughout the life of the engine.

What is needed is an effective, inexpensive and simple method for restoring the effectiveness of an intercomponent seal in a turbine engine. Ideally the restored seal is more durable than and at least as effective as the original seal.

SUMMARY OF THE INVENTION

It is therefore an object of the invention to restore the effectiveness of the seal between a rotating component and a nonrotating component in a turbine engine.

It is a further object to minimize the time and expense associated with restoration of the seal, to maximize the useful life of the restored seal and to provide for convenient and inexpensive replacement of the restored seal in the event that it becomes too worn to be effective.

According to the invention, a turbine engine having a worn knife edge seal is refurbished by installing a replaceable brush seal in tandem with the worn knife edge ring.

The invention is advantageous in several respects. The brush seal augments the existing, worn knife edge seal so that expensive and time consuming replacement or renovation of the knife edge ting and seal land is avoided. Because of the superior sealing characteristics of brush seals, the refurbished seal is at least as effective as an unworn knife edge seal. Moreover, the brush seal is installable after only minimal reconfiguring of the component upon which the brush seal is installed. The brush seal is inherently more wear resistant than the knife edge seal. However if subsequent replacement of the brush seal is necessary it is easily and conveniently accomplished with minimal disassembly of the engine.

These advantages and the features of the invention will become more apparent in light of the following description of the best mode for carrying out the invention and the accompanying drawings

BEST MODE FOR CARRYING OUT THE INVENTION

Figure 1:
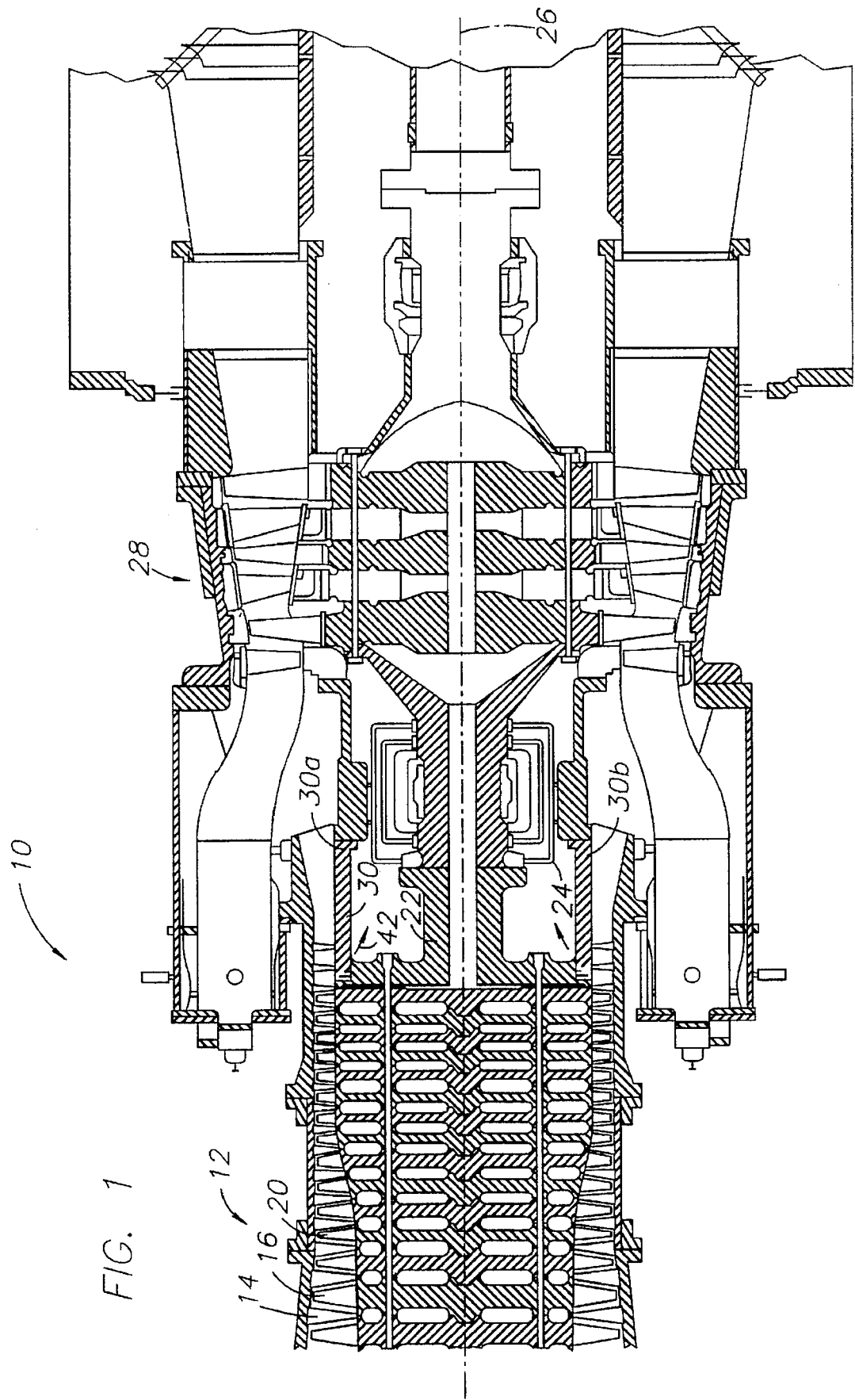
FIG. 1 is a schematic, cross sectional side view of a portion of a turbine engine of a type used for electrical power generation.

FIG. 1 illustrates a portion of a turbine engine 10 of a type used for electrical power generation. The engine includes a compressor 12 having nonrotating stator vanes such as vane 14 and rotating blades such as blade 16 extending radially across a main flowpath 20. A compressor rotor assembly 22, supported by bearings housed within a bearing compartment 24, rotates about a central axis 26 to transfer rotational energy from a turbine 28 to the compressor blades. A nonrotating, substantially cylindrical, hollow drum or barrel 30 circumscribes the bearing compartment and extends forward to form the inner flowpath boundary, at the rear end of the compressor. The barrel comprises upper and lower half-barrels or segments 30a, 30b separably secured together by bolts, not shown, extending vertically through the upper segment (half-barrel) and threaded into the lower segment (half-barrel).

Figure 2:
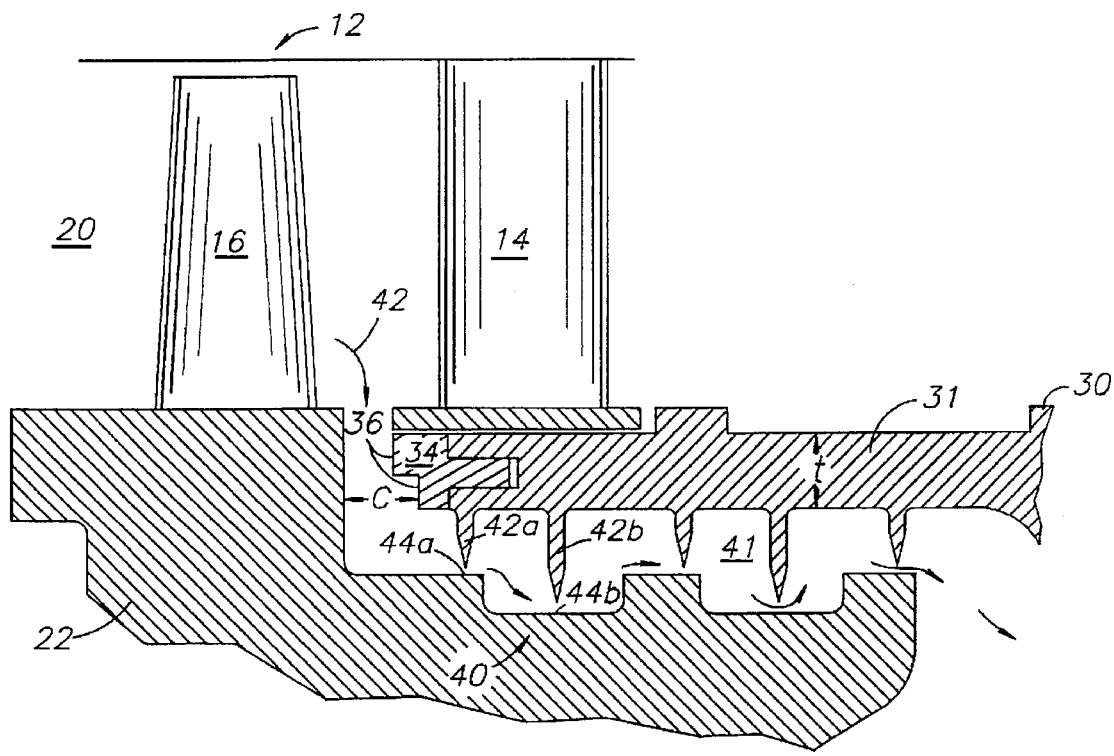
FIG. 2 is a more detailed cross sectional side view of the compressor discharge region of the engine of FIG. 1 showing an array of knife edge seals between a rotating compressor rotor and a neighboring nonrotating barrel having an insert ring at its forward end.
Figure 3:
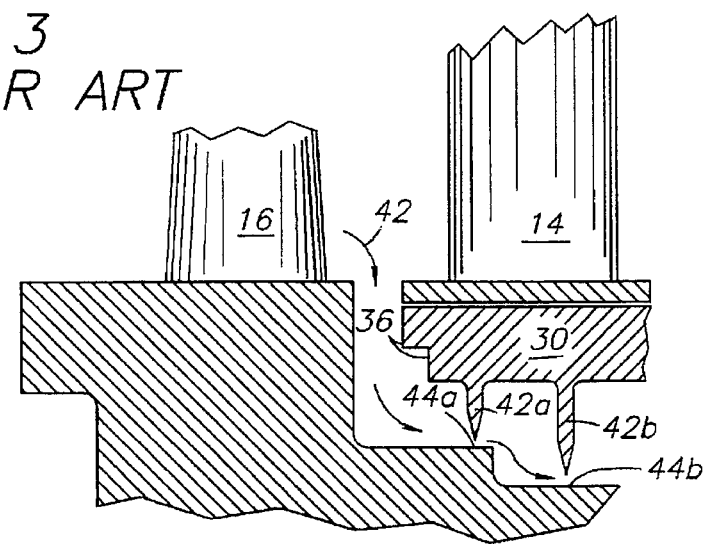
FIG. 3 is a view similar to that of FIG. 2 wherein the barrel is of unitary construction at its forward end.

Referring to FIG. 2, additional features of the rotor 22 and barrel 30 are illustrated in greater detail. The barrel 30 extends forwardly so that its forward end 31 axially overlaps a portion of the rotor 22. The barrel is hollow and substantially cylindrical and has a cylinder wall of thickness t in the vicinity of the forward end 31. An insert ting 34 may be attached to the forward end of the barrel to augment the barrel's length; alternatively the forward end of the barrel may be unitary as shown in FIG. 3. In either case, a face 36 defines the forwardmost extremity of the barrel.

The rotor 22 and the forward end 31 of the barrel 30 cooperate to form a seal 40 in the annular gap 41 between the barrel and the rotor. The seal 40 comprises an array of knife edge seals (such an array is commonly referred to as a labyrinth seal). Each knife edge seal comprises a knife edge ring, such as representative rings 42a, 42b, extending radially inwardly from the barrel 30 and into close proximity to a seal land such as representative lands 44a, 44b on the rotor. The seal inhibits the leakage of air 42 out of the flowpath and into the vicinity of the bearing compartment 24 (FIG. 1).

During engine operation (and particularly during a brief break-in period early in the engine's life) the knife edge rings can contact the rotating seal lands because of imbalances, imperfections and thermal response differences inherent in even a properly functioning engine. Such contact erodes the knife edge rings and the seal lands and rapidly degrades the effectiveness of the seal. As a consequence engine efficiency diminishes with a corresponding increase in fuel consumption and operating cost. Furthermore, the beating compartment (FIG. 1), which operates at an elevated temperature, is exposed to detrimental quantities of hot air thereby increasing the risk of extensive temperature related damage. It may be possible to renovate the worn seals or replace them with new seals of the same type. Since most of the wear occurs during the brief break-in period following renovation or replacement there is little long term benefit. Moreover either option is expensive and time consuming and the revenues lost while the engine is out of service can be considerable.

According to the invention, the expense and revenue loss associated with renovating or replacing the knife edge seals are minimized by augmenting the worn labyrinth seal with a replaceable brush seal installed near the forward end of the barrel. Preferably the brush seal is mounted on the nonrotating barrel rather than on the rotor to avoid exposing the brush seal to tremendous rotational forces. Because brush seals have inherently better sealing characteristics than knife edge seals, the refurbished seal is at least as effective as an unworn knife edge seal. Moreover, brush seals have an inherent wear resistance so that the time interval between subsequent seal replacements is maximized.

To facilitate carrying out the method of the invention, the bolts securing the upper and lower barrel segments 30a, 30b (FIG. 1) to each other are removed, and the segments are individually removed from the engine.

Figure 4:
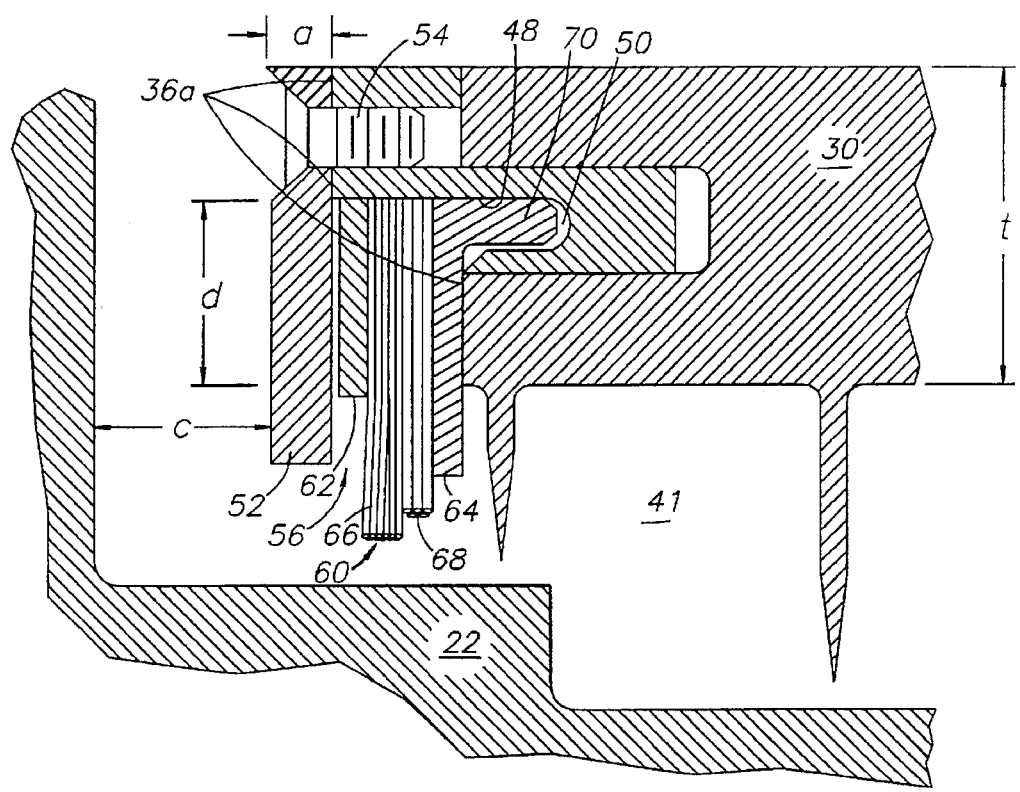
FIG. 4 is a view similar to that of FIG. 2 showing a brush seal installed on the barrel according to the preferred embodiment of the invention.

Referring to FIG. 4, the method of improving the airsealing effectiveness between the rotor 22 and the barrel 30 includes the step of reconfiguring the barrel segments to provide a means for receiving and retaining a brush seal. The reconfiguring step includes machining the face 36 (FIG. 2 or FIG. 3) of each barrel segment to reduce the barrel's axial length by a predetermined amount a and to reduce the wall thickness t by a predefined a mount d in the vicinity of the face. The machining exposes a new face 36a and forms a seal seat 48 on the barrel wall. A circumferentially extending capture slot 50 is machined into the newly exposed face 36a and a retainer 52 is attached to the face 36a by threaded fasteners 54 or by other suitable means such as welding. The retainer 52 cooperates with the face 36a and the seal seat 48 to define a circumferentially extending groove 56. A brush seal 60 having backing plates 62, 64, seal bristles 66 and backing bristles 68 is installed so that the bristles extend toward the rotor to impede the flow of air through the gap 41. Radial retention of the brush seal is accomplished by the seal seat 48 and by engagement between foot 70 on the backing plate 64 and the capture slot 50. The seal is axially trapped between the face 36a and the retainer 52.

The predetermined mount a by which the barrel is shortened is at least as much as the thickness of the retainer 52, and in the preferred embodiment equals the thickness of the retainer 52. Consequently, the reconfiguring of the barrel does not diminish the axial clearance c between the rotor 22 and the retainer 52 and therefore does not raise the risk of contact between the rotor and the barrel (caused, for example, by axial shifting of the rotor or thermal growth differences between the rotor and the barrel during engine operation).

The predefined amount d by which the thickness of the barrel is reduced establishes sufficient radial space for the brush seal. The use of a radially shorter brush seal could reduce or even eliminate the need to reduce the wall thickness. However longer brush seals are preferred since short brush seals have insufficient bristle resilience to form a reliable and effective seal.

The step of reconfiguring the barrel does not include the removal (for example by machining) of the knife edge rings. Leaving the knife edge rings a place is beneficial since the effort and expense associated with their removal is avoided. Moreover, any reconfiguring operation carded out on the barrel involves some risk of inadvertently damaging it. Since the barrel is an expensive component, it is advantageous to avoid, as far as possible, any operations which carry the risk of damage. Finally, the knife edge seals, despite being worn, may have some residual sealing effectiveness.

Figure 5:
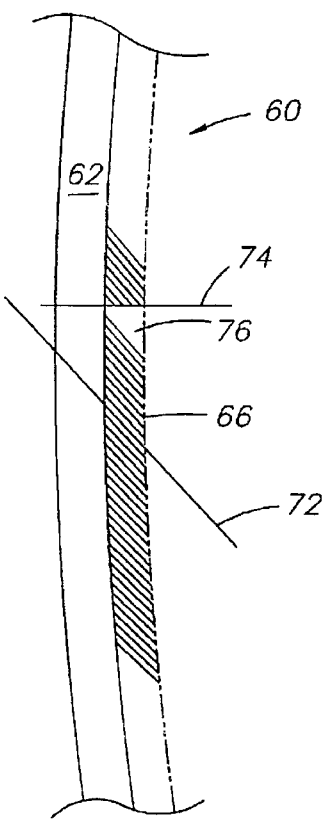
FIG. 5 is a front view of a portion of a brush seal illustrating the segmentation of the seal parallel to the seal bristles.

Because the barrel comprises upper and lower barrel segments, each segment subtending approximately 180 degrees of are, the retainer 52 also comprises two 180 degree segments. The brush seal is also segmented to facilitate its installation and removal as discussed below, and comprises a single 180 degree upper segment and one or more lower segments, the lower segments collectively subtending 180 degrees of arc. Such a seal is typically manufactured as a full ring, a portion of which is illustrated in FIG. 5, and is subsequently cut into segments. The cuts are made parallel to the bristles, e.g. along the cut line 72. A cut at any other orientation, for example along radial line 74, will liberate a quantity of bristles as shown by triangular void 76 and compromise the effectiveness of the brush seal.

The brush seal segments 60 may be inserted axially (i.e. parallel to axis 26) into the capture slot 50 prior to attachment of the retainer 52 to the face 36a. In the preferred embodiment, the retainer is attached first and the segments are slid circumferentially into the groove 56. The groove is slightly oversized with respect to the brush seal segment so that the seal segment slides easily in the groove. The loose fit between the brush seal and the groove also guards against any excessive stresses which may develop due to differential thermal response. In the preferred embodiment, installation is further facilitated by using two lower brush seal segments, each extending approximately 90 degrees, rather than a single 180 degree segment. A single 180 degree brush seal segment is used on the upper barrel because smaller segments can easily slide out of the groove when the upper barrel segment is oriented with the groove ends facing downward in preparation for reuniting the upper barrel segment with the lower barrel segment.

Depending on the operating gas pressures in the engine, the brush seal may be a multilayered brush seal having at least two layers of bristles (seal bristles and backing bristles) or a unilayer brush seal (one having seal bristles, but no backing bristles). The brush seal of the preferred embodiment is a multilayered brush seal. Such a seal is more completely described in U.S. Pat. No. 5,201,530. In the context of the present invention it is sufficient to appreciate that the multilayered brush seal has a layer of seal bristles 66 and a layer of shorter, thicker backing bristles 68 sandwiched between two backing plates 62, 64. Because of the pressure difference across the seal, the seal bristles tend to deflect toward the low pressure side of the seal (toward the gap 41 in FIG. 4). The shorter, thicker backing bristles, being less resilient than the seal bristles, resist deflection of the seal bristles to preserve the integrity of the seal. Any tendency of the backing bristles to deflect is similarly resisted by the backing plate 64. If a unilayer brush seal were used, its backing plate would have to be longer, in proportion to the seal bristles, than the backing plate of a multilayered seal in order to adequately support the seal bristles. Because of the long backing plate, any radial shifting of the rotor due to imbalances or thermal growth (commonly referred to as rotor excursions) can result in contact between the backing plate and the rotor, resulting in damage to both. The risk of damage is diminished by the multilayered brush seal since the resiliency of the backing bristles precludes any damage in the event that they contact the rotor. Thus, the engine benefits not only from the inherent wear resistance of a brush seal, but from the damage resistance of the multilayered brush seal as well.

The reconfiguring of the barrel to provide means for receiving and retaining the brush seal is accomplished with both the upper and lower barrel segments removed from the engine. Subsequent replacement of brush seal segments, should they become too worn to be effective, requires that only the upper barrel be separated from the lower barrel and removed from the engine. Once the upper barrel is separated from the lower barrel, the worn brush seal segments on either the upper or lower barrel are removed by sliding the segments circumferentially out of the groove and sliding new brush seal segments into place.

The step of reconfiguring the barrel segments, as described, includes machining the barrel to reduce its length thereby precluding contact between the barrel and the rotor during engine operation. In the event that a reduction in the clearance c between the barrel and the rotor is tolerable, the amount of machining can be reduced or even eliminated. Reducing the barrel wall thickness to accommodate the length of the brush seal may also be unnecessary if the existing gap 41 is large enough to accommodate the brush seal or if advances in brush seal technology produce short seals having adequate resilience and sealing effectiveness.

We claim:

1. A refurbished gas turbine engine component having at least one knife edge seal for inhibiting air leakage through an intercomponent gap between the component and a second component, the refurbished component characterized by:

a brush seal mounted on the refurbished component in tandem with the knife edge seal, the bristles of the brush seal extending toward the second component for impeding the leakage of air through the intercomponent gap.

2. The refurbished component of claim 1 characterized in that the component comprises two component segments, the brush seal is also segmented and the brush seal segments are mounted in a circumferentially extending groove so that the seal is installable and removable by separating the component segments and sliding the brush seal segments circumferentially in the groove.

3. A method of improving the air sealing effectiveness between a rotating component and a nonrotating component in a turbine engine, the rotating and nonrotating components being separated by a gap with knife edge seals extending across the gap to inhibit leakage of air therethrough, the method characterized by:

providing a brush seal;

reconfiguring the nonrotating component to provide means for receiving and retaining the brush seal in tandem with the knife edge seals; and installing the brush seal so that the seal bristles extend toward the rotating component to impede the flow of air through the gap, the brush seal being retained by the receiving and retaining means.

4. The method of claim 3 wherein the nonrotating component is hollow and substantially cylindrical and has a wall thickness and a face, the method characterized in that the step of reconfiguring the nonrotating component includes:

creating a capture slot in the face of the nonrotating component for radially retaining the brush seal; and attaching a retainer to the nonrotating component so that the retainer cooperates with the face to axially trap the brush seal.

5. The method of claim 4 characterized in that the reconfiguring step includes reducing the wall thickness by a predefined amount in the vicinity of the face to form a seal seat and accommodate the radial dimension of the brush seal.

6. The method of claim 4 characterized in that the reconfiguring step regulates the axial length of the nonrotating component.

7. The method of claim 3 wherein the brush seal is a multilayered brush seal.

8. The method of claim 3 wherein the nonrotating component comprises upper and lower component segments each component segment subtending approximately 180 degrees of arc, the retainer also comprises upper and lower retainer segments, each retainer segment subtending approximately 180 degrees of arc, and the brush seal comprises an upper brush seal segment subtending approximately 180 degrees of arc and one or more lower brush seal segments, the lower brush seal segments collectively subtending approximately 180 degrees of arc.

9. A method of improving the air sealing effectiveness between a rotating component and a nonrotating component in a turbine engine, the nonrotating component being hollow and substantially cylindrical and having a wall thickness and a face, the rotating and nonrotating components being separated by a gap with knife edge seals extending across the gap to inhibit leakage of air therethrough, the method characterized by:

reconfiguring the nonrotating component by reducing its axial length by a predetermined amount and reducing its wall thickness in the vicinity of the face by a predefined amount whereby a seal seat is formed;

creating an axially and circumferentially extending capture slot in the face of the nonrotating component;

attaching a retainer to the face so that the retainer cooperates with the face and the seal seat to define a circumferentially extending groove; and installing a brush seal in the groove so that the bristles of the seal extend toward the rotating component to impede the flow of air through the gap;

the brush seal being radially retained by the capture slot and the seal seat and axially retained by the retaining ting and the face.

* * * * *

UNITED STATES PATENT AND TRADEMARK OFFICE
CERTIFICATE OF CORRECTION

PATENT NO. : 5,630,590
DATED : May 20, 1997
INVENTOR(S) : Joseph P. Bouchard and Merrell W. Long It is certified that error appears in the above-identified patent and that said Letters Patent is hereby corrected as shown below:

In Claim 1, column 5, line 46, the word "gas" should be deleted.

Signed and Sealed this

Ninth Day of December, 1997

*Attest:*

BRUCE LEHMAN

*Attesting Officer    Commissioner of Patents and Trademarks*